(12) United States Patent
Hu et al.

(10) Patent No.: US 8,386,468 B2
(45) Date of Patent: Feb. 26, 2013

(54) SPATIAL QUERY PROCESSING WITH QUERY WINDOW INDEX

(75) Inventors: Ying Hu, Hollis, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 248 days.

(21) Appl. No.: 12/869,085

(22) Filed: Aug. 26, 2010

(65) Prior Publication Data
US 2012/0054195 A1 Mar. 1, 2012

(51) Int. Cl.
*G06F 17/30* (2006.01)
(52) U.S. Cl. .................. 707/713; 707/743
(58) Field of Classification Search .......... 707/713, 707/743
See application file for complete search history.

(56) References Cited

U.S. PATENT DOCUMENTS

| | | | |
|---|---|---|---|
| 7,080,065 B1 | 7/2006 | Kothuri et al. | |
| 7,185,023 B2 | 2/2007 | Kothuri et al. | |
| 7,219,108 B2 | 5/2007 | Kothuri et al. | |
| 7,499,941 B2 | 3/2009 | Michaeli et al. | |
| 2005/0203932 A1* | 9/2005 | Kothuri et al. | 707/100 |
| 2005/0222978 A1* | 10/2005 | Drory et al. | 707/3 |
| 2008/0162424 A1* | 7/2008 | Adler | 707/2 |
| 2011/0161328 A1* | 6/2011 | Park et al. | 707/743 |

OTHER PUBLICATIONS

"Oracle9i Databse Daily Feature—Oracle Spatial & Locator: Location-Based Service for Oracle9i", Oracle Technology Network, printed Jun. 16, 2010 from http://www.oracle.com/technology/products/oracle9i/daily/june21.html . . . , pp. 1-3.
"Oracle Spatial Option—Location-Based Services for Oracle9i", Oracle Technology Network, printed on Jun. 16, 2010 from http://www.oracle.com/technology/products/spatial/htdocs/data_sheet_ . . . , pp. 1-9.

* cited by examiner

*Primary Examiner* — Son T Hoang
(74) *Attorney, Agent, or Firm* — Kraguljac Law Group LLC

(57) ABSTRACT

One example method of spatial query processing using query window indexes includes receiving a spatial query on spatial data that has an associated spatial data index. The spatial query specifies a query window. A query window index structure is constructed that describes a geometry of the query window. The query window index structure is compared to the spatial data index and, when necessary, to the spatial data to determine a spatial relationship between the query window and the spatial data.

16 Claims, 10 Drawing Sheets

US 8,386,468 B2

SPATIAL QUERY PROCESSING WITH QUERY WINDOW INDEX

BACKGROUND

A spatial or geographic database can include data concerning locations of features in space or on a surface. Spatial data can include geometric data that includes simple primitive elements such as lines, curves, polygons (with and without holes), and compound elements that are made up of a combination of the primitive elements. For example, a geographical database can include data concerning the location of various objects in a region. Along these lines, a geographic database can include mathematical representations of counties, cities, homes, apartment buildings, parks, businesses, subway stations, and other features. The location information could be in the form of latitude and longitude data or other data that defines position.

Once a database including this information is created it is typically desired to access and utilize the information. One way that the information in the databases is utilized involves determining the relative positions of particular locations. Along these lines, a person might want to find certain types of businesses in a zip code region. At times, it may be desirable to generally determine whether objects in a database have overlapping locations and, if so, the extent of the overlap.

Analyses such as those described above on data in spatial and/or geographic databases can present a number of problems. Determining relationships among data in a database can overtax memory and computing power, take an unacceptable period of time or cost an unacceptable amount of money. This is especially true with data in geographic databases.

For example, one problem concerning trying to determine whether objects have overlapping locations involves actually comparing the outlines of the objects to see if any interactions exist. However, carrying out a point-by-point comparison of two geometries typically requires quite a long time, in some cases, on the order of minutes and, in extreme cases, hours.

Spatial indexes are used by spatial databases (databases which store information related to objects in space) to optimize spatial queries. Indexes used by non-spatial databases cannot effectively handle spatial data features such as how far apart two points are and whether points fall within a spatial area of interest. Thus, other indexing techniques have been developed for spatial data. Common spatial indexing methods include an R-tree. In an R-tree, objects (shapes, lines and points) are grouped using minimum bounding rectangles (MBR). Objects are added to an MBR within the index that will lead to the smallest increase in its size. A hierarchy of MBRs is constructed in which child MBRs descend from a parent MBR that contains them. The index is stored as a set of node entries, with each entry storing coordinates of its associated MBR as well as an identifier that links the MBR to at least one child node.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
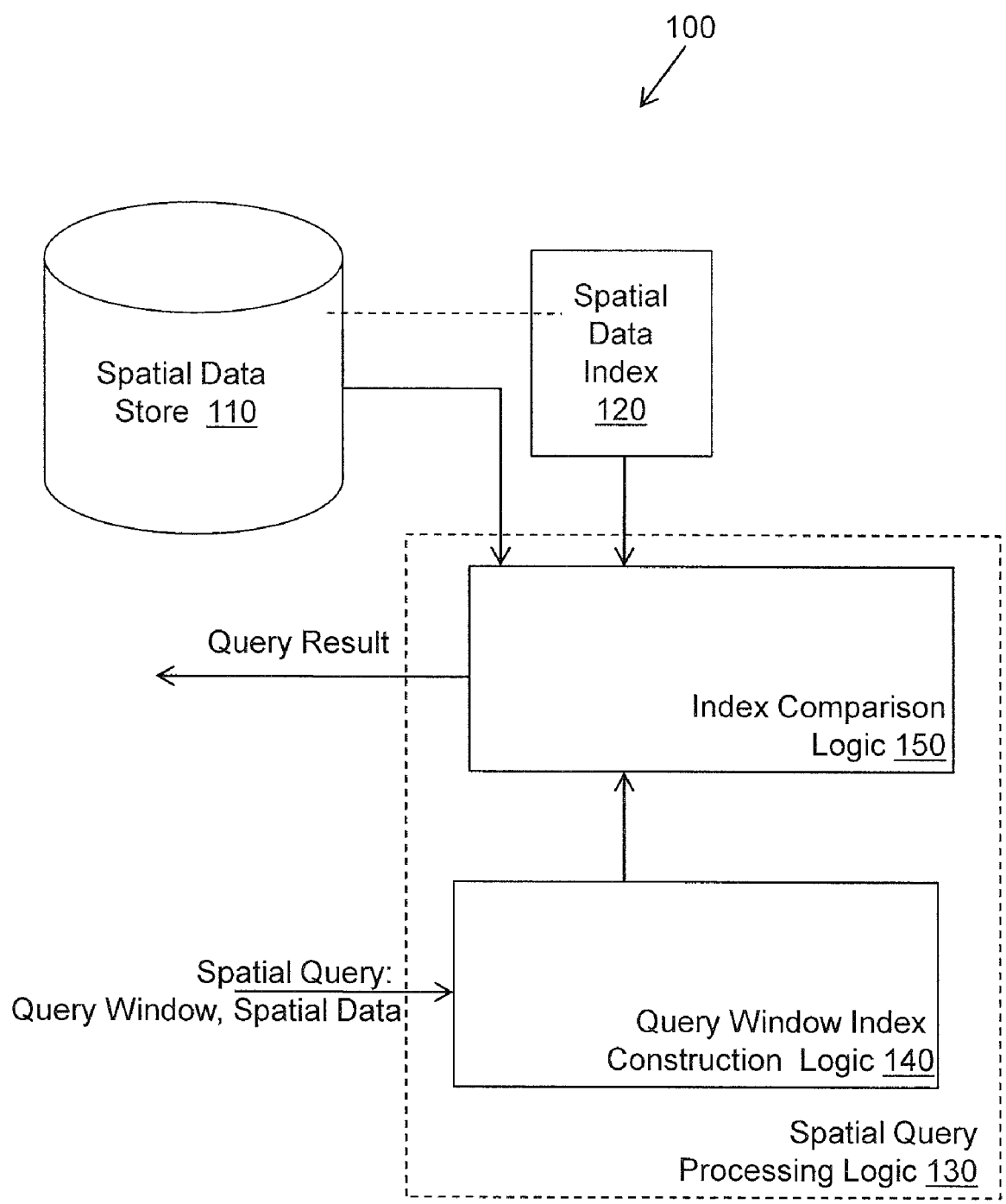
FIG. 1 illustrates an example embodiment of a system associated with spatial query processing using a query window index.

Spatial queries specify a query window, which may have a complex geometry. Typically, spatial filter interior optimizations are used along with spatial indexes to improve the processing speed of spatial queries. Interior optimizations are based on building an approximation of an interior of the query window and using the approximation to narrow a search for corresponding spatial data using the spatial data index. For example, a linear quad-tree structure or a circle that is contained within the query window may be constructed and compared with the spatial data index to identify portions of spatial data that may be relevant to the query. Often, a second level of searching is performed that involves searching the rows of the identified portions of spatial data. While these interior optimizations speed query processing, they involve construction of the approximation of the query window interior, which can be time-consuming. In addition, because the constructed interior is an approximation and cannot be used as the query window, a second search on the underlying spatial data using the query window is often necessary, which is also time-consuming.

The systems and methods described herein include constructing an index structure on a spatial query window to process the query. The index structure is a representation of the query window that is not an approximation. Therefore, the index structure can be used to determine a topological relationship between a geometry object and the query window using the spatial data index and spatial data without having to search the query window itself.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, instructions stored in a non-transitory computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Query", as used herein, refers to a semantic construction that facilitates gathering and processing information. A query may be formulated in a database query language (e.g., SQL), an OQL, a natural language, and so on.

Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

FIG. 1 illustrates an example embodiment of a computing system 100 that processes spatial queries on a spatial data store 110 that stores spatial data. A spatial data index 120 has been constructed on the spatial data and is available for query processing. For example, the spatial data index may be an R-tree index that includes a plurality of MBR elements. Of course, any other index that is suitable for spatial data may also be employed in practice of the invention.

The computing system 100 includes a spatial query processing logic 130. The spatial query processing logic 130 is configured to receive spatial queries on the spatial data. The spatial queries specify a query window and seek to return spatial data having a specified relationship to the query window. The spatial query processing logic 130 includes a query window index construction logic 140 configured to construct a query window index structure describing a geometry of the query window. The query window index structure is made up of one or more query window index structure elements. For example, the query window index structure may be an R-tree index that has query window index elements that each include a set of one or more boundary segments and an MBR that contains the one or more boundary segments.

To construct an R-tree that describes query window geometry, the query window index construction logic 140 may represent one or more query window boundary segments as an R-tree node (i.e., MBR) and build an R-tree on the nodes. The node can be an MBR that contains the boundary segments represented by the node. For geodetic data each R-tree node may correspond to a minimum bounding box (MBB) instead of an MBR (see FIG. 5). To facilitate faster processing, the R-tree can be constructed in-memory using any appropriate R-tree construction technique, such as the STR method described in "STR: A Simple and Efficient Algorithm for R-Tree Packing" (Leutenegger, Edgington, and Lopez, ICDE 1997: pp 497-506). While an R-tree index structure is described herein, many different index structures may be used to describe the geometry of the query window.

The spatial query processing logic also includes an index comparison logic 140 configured to compare the query window index structure to the spatial data index and to the spatial data if necessary. In one embodiment, the index comparison logic 140 performs the comparison by identifying a spatial data index element, such as an MBR. The index comparison logic 140 searches the query window index structure to determine if the identified spatial data index element intersects a query window index structure element, such as an MBR.

If the spatial data index element intersects a query window index structure element MBR, the index comparison logic 140 then determines, by way of the query index structure, if the one or more boundary segments represented by the query window index structure element intersect the spatial data index element. If a boundary segment intersects the spatial data index element, the index comparison logic accesses the spatial data store 110 to determine if spatial data represented by the spatial data index element intersects the boundary segment. If the spatial data intersects the boundary segment, the index comparison logic 140 determines that the query window intersects the spatial data. In this manner, the index comparison logic 140 eliminates from the search, without having to access the spatial data store 110, spatial data represented by spatial data index elements that do not intersect the query window. The index comparison logic 140 then accesses the spatial data store 110 to analyze spatial data that has not been eliminated from the search.

If the spatial data index element does not intersect a given query window index structure element, the index comparison logic 140 determines, by way of the query index structure, whether the spatial data index element is completely contained within the query window. If it is known that a spatial data index element does not intersect any boundary segments of the query window, any selected spatial data point that lies within the spatial data index element can be used to check to see if the entire spatial data index element lies within the query window. For example, if the spatial data index element is an MBR that is known to be either completely contained by or completely outside of the query window, any spatial data point that lies within the MBR can be used to check if the spatial data represented by the MBR is contained in the query window. If the selected spatial data point is contained within the query window, the index comparison logic 140 determines that the corresponding spatial data index element is contained within the query window.

For geodetic data (i.e., angular coordinates or longitude and latitude), the spatial data index element may be a minimum bounding box (MBB) that includes disconnected regions on the earth's surface. To account for this, a data point from each of the disconnected regions is checked to determine if the region is contained within the query window. If all of the data points from the disconnected regions are contained within the query window, the index comparison logic 140 determines that the corresponding spatial data index element is contained within the query window. If any one of the data points from the disconnected regions is not contained within the query window, the index comparison logic 140 determines that the spatial data index element is not contained within the query window.

To determine if a geodetic or non-geodetic data element, which may contain multiple disconnected polygons, is contained within the query window, every disconnected polygon is checked against the query window to determine if all of the polygons in the data element are contained within the query window. If any of the polygons is not contained within the query window, the index comparison logic 140 determines that the data element is not contained within the query window. If all of the polygons are contained within the query window, the index comparison logic 140 determines that the data element is contained within the query window. The spatial query processing logic 130 returns a spatial relationship between the query window and the spatial data as determined by the comparison between the query window index structure, the spatial data index, and the spatial data.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
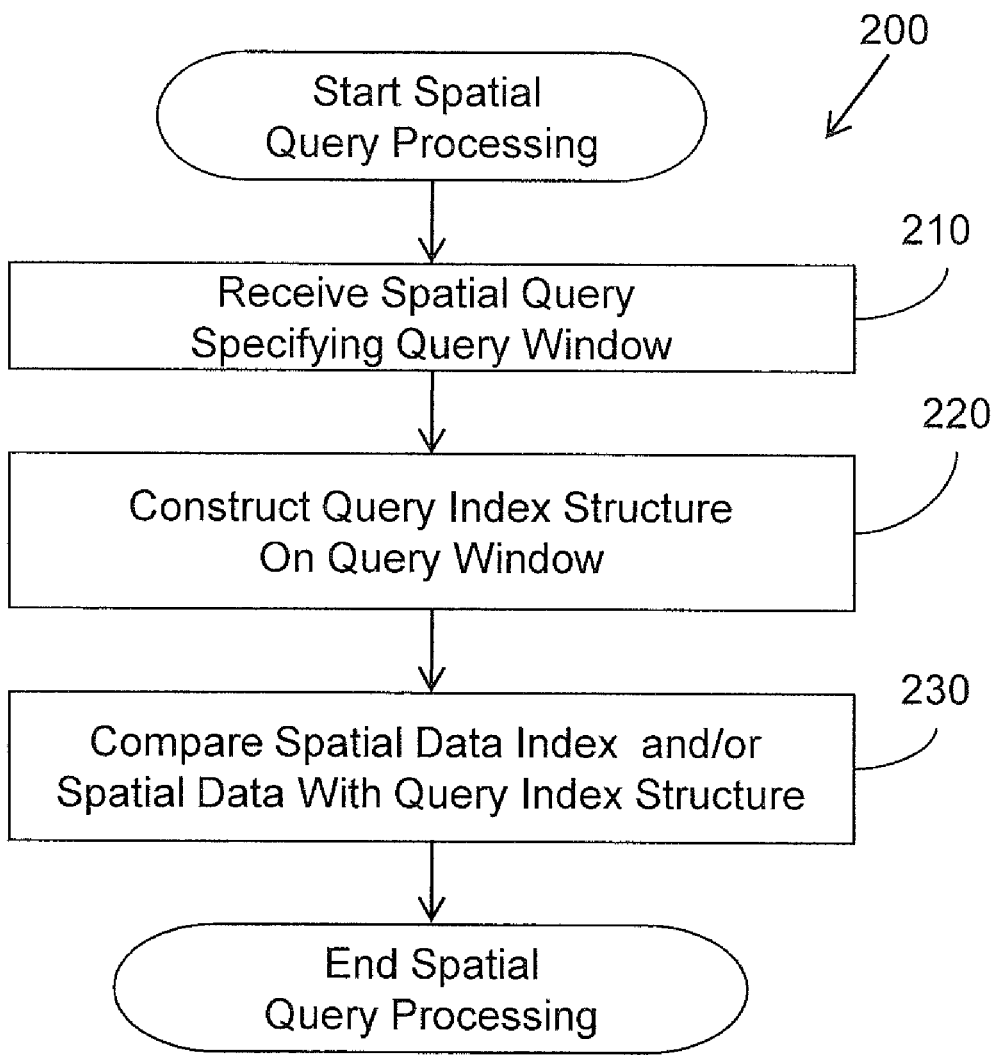
FIG. 2 illustrates an example embodiment of a method associated with spatial query processing using a query window index.

FIG. 2 illustrates an example embodiment of a method 200 that is associated with spatial query processing using query window indexes. Method 200 includes, at 210, receiving a spatial query on spatial data that specifies a query window. At 220 a query window index structure is constructed that describes a geometry of the query window. The query window index structure may be stored in memory associated with query processing. At 230 the query window index structure is compared to the spatial data index, and in some instances the spatial data, to determine a spatial relationship between the query window and the spatial data.

Figure 3:
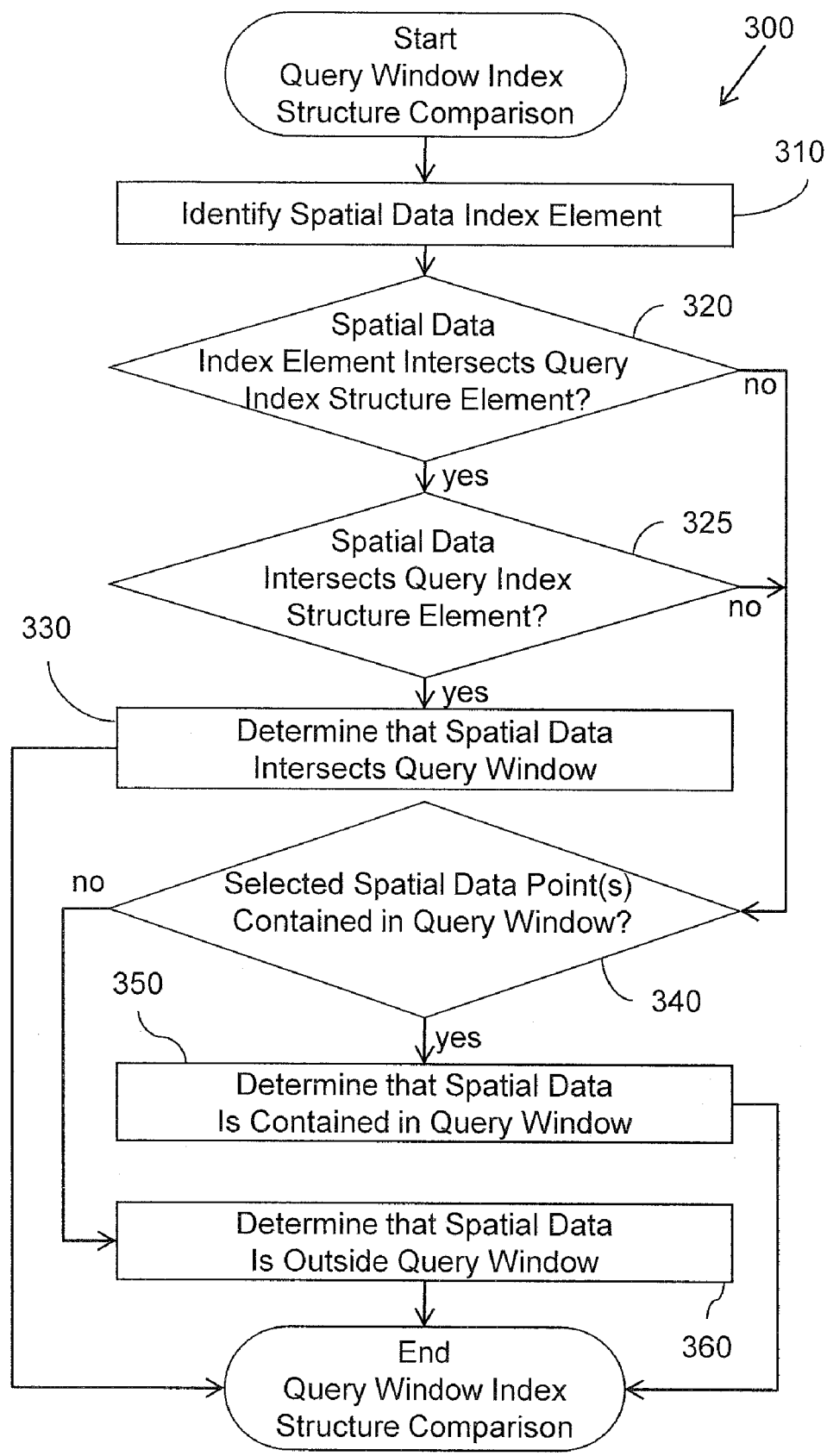
FIG. 3 illustrates another example embodiment of a method associated with spatial query processing using a query window index.

FIG. 3 illustrates an example embodiment of a method 300 that is associated with comparing a spatial data index that includes a plurality of spatial data index elements (e.g., MBRs) with a query window index structure that includes a plurality of query window index structure elements (e.g., a set of query window boundary segments and an MBR that contains them) to determine a spatial relationship between the query window and the spatial data. Method 300 includes, at 310, identifying a spatial data index element. At 320 the query window index structure is searched to determine if the spatial data index element intersects a query window index structure element. If the spatial data index element intersects a boundary segment as determined by comparison with the query window index structure, at 325 a separate process can be called upon to determine if the spatial data represented by the spatial data index element intersects the boundary segment of the query window. If so, at 330 it is determined that the query window intersects the spatial data. It should be noted that when the query window is a poly-line or a multi-poly-line (e.g., a road route or routes), only the steps 320-330 need be performed to determine if any spatial data falls in the query window.

If the spatial data index element does not intersect any boundary segments of the query window, at 340 the method includes determining whether the spatial data index element is completely contained within the query window. This may be done by selecting a data point from each disconnected region in the spatial data index element (in two-dimensional Cartesian space, the spatial data index element includes a single region). Note that the data point can be selected from data in the spatial data index (FIG. 1 block 120) without accessing the spatial data store (FIG. 1 block 110). If every selected data point is contained within the query window, at 350 it is determined that the spatial data index element is contained within the query window. If any one of the selected data points is not contained within the query window, at 360 it is determined that the spatial data index element lies completely outside the query window. Various techniques may be used to determine if a spatial data point is contained within the query window. A few of the techniques will be described below in connection with an example of spatial query processing.

Figure 4A:
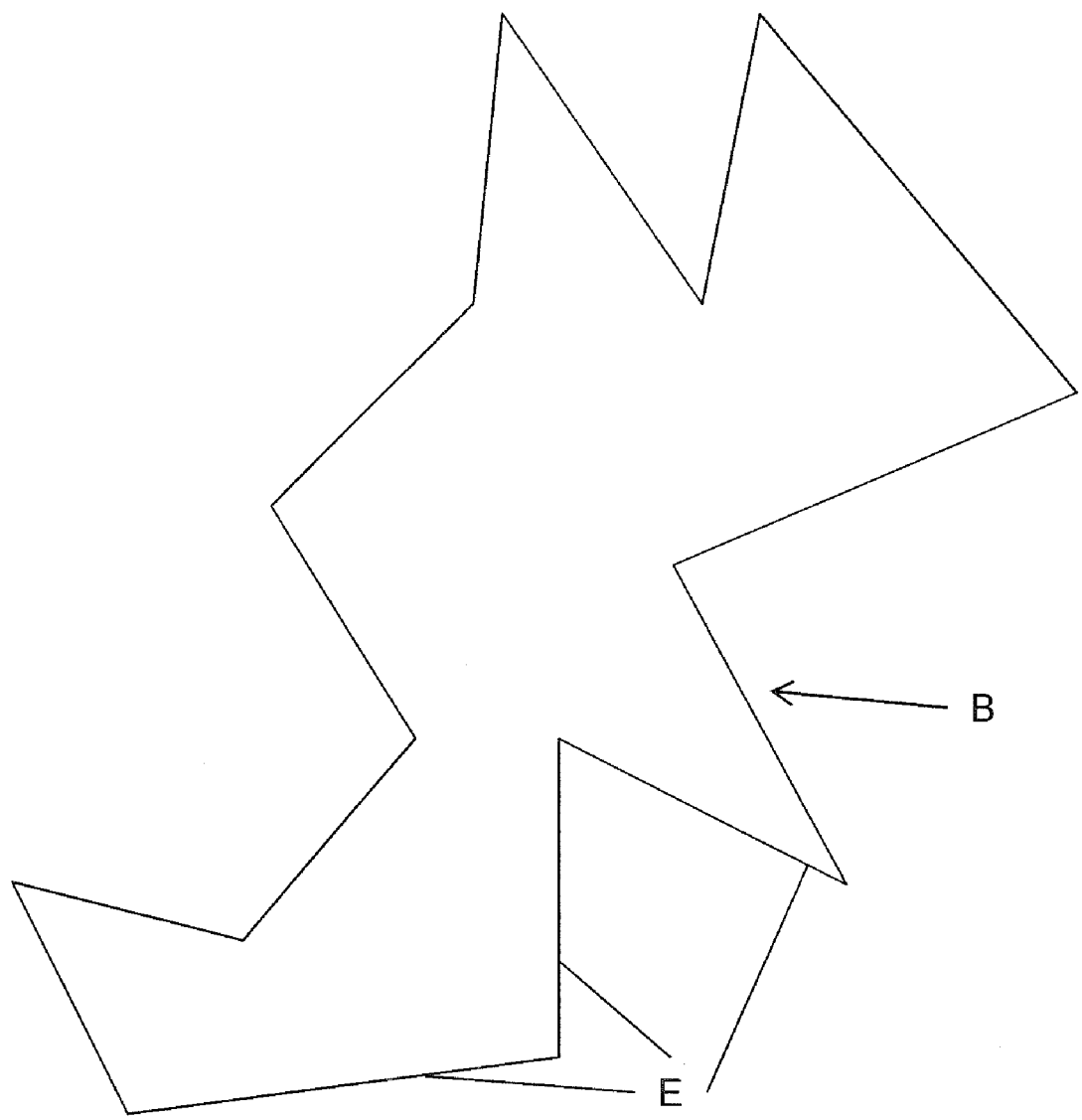
FIGS. 4A-4E illustrate an example of spatial query processing using a query window index.
Figure 4B:
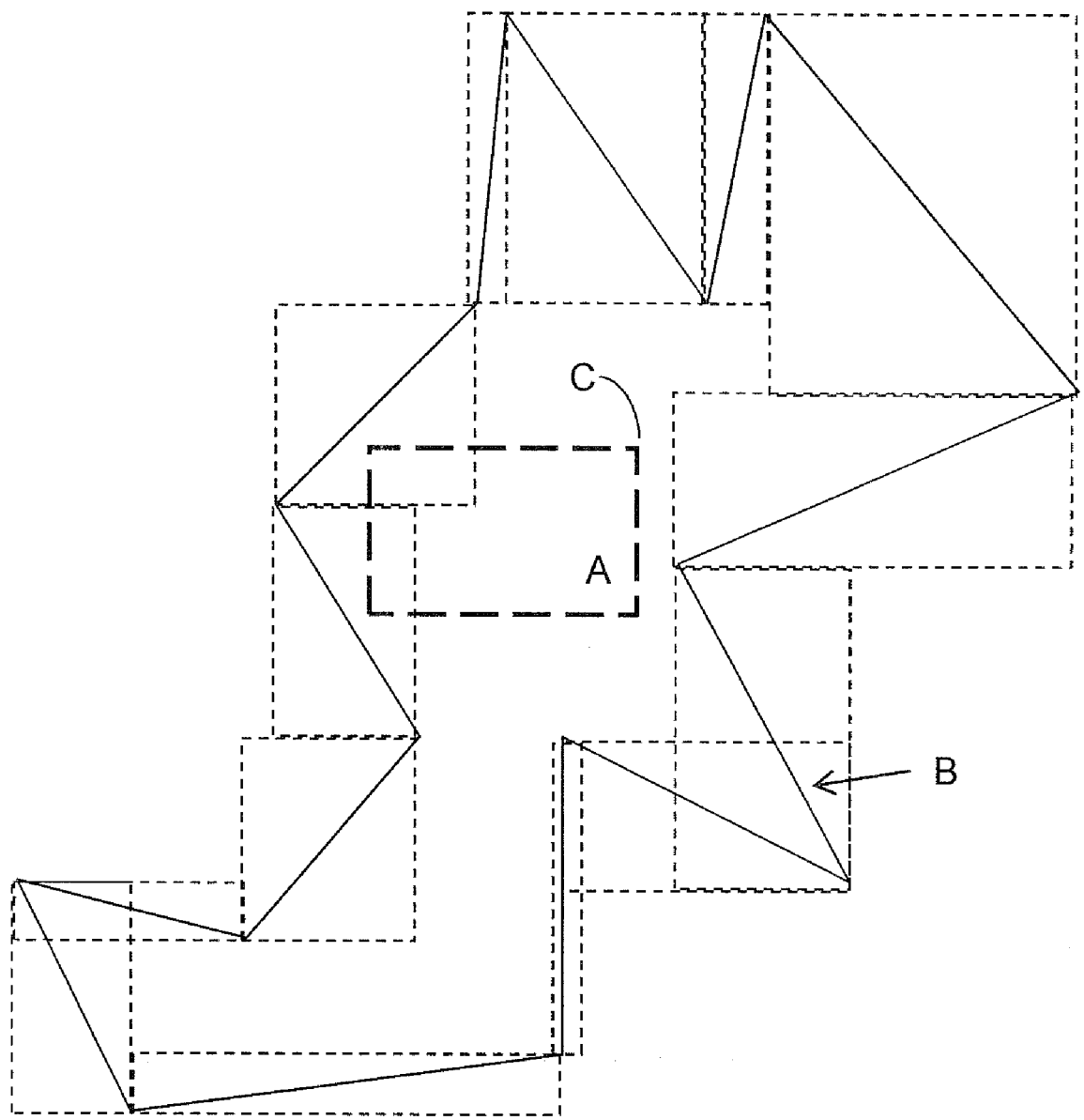
Figure 4C:
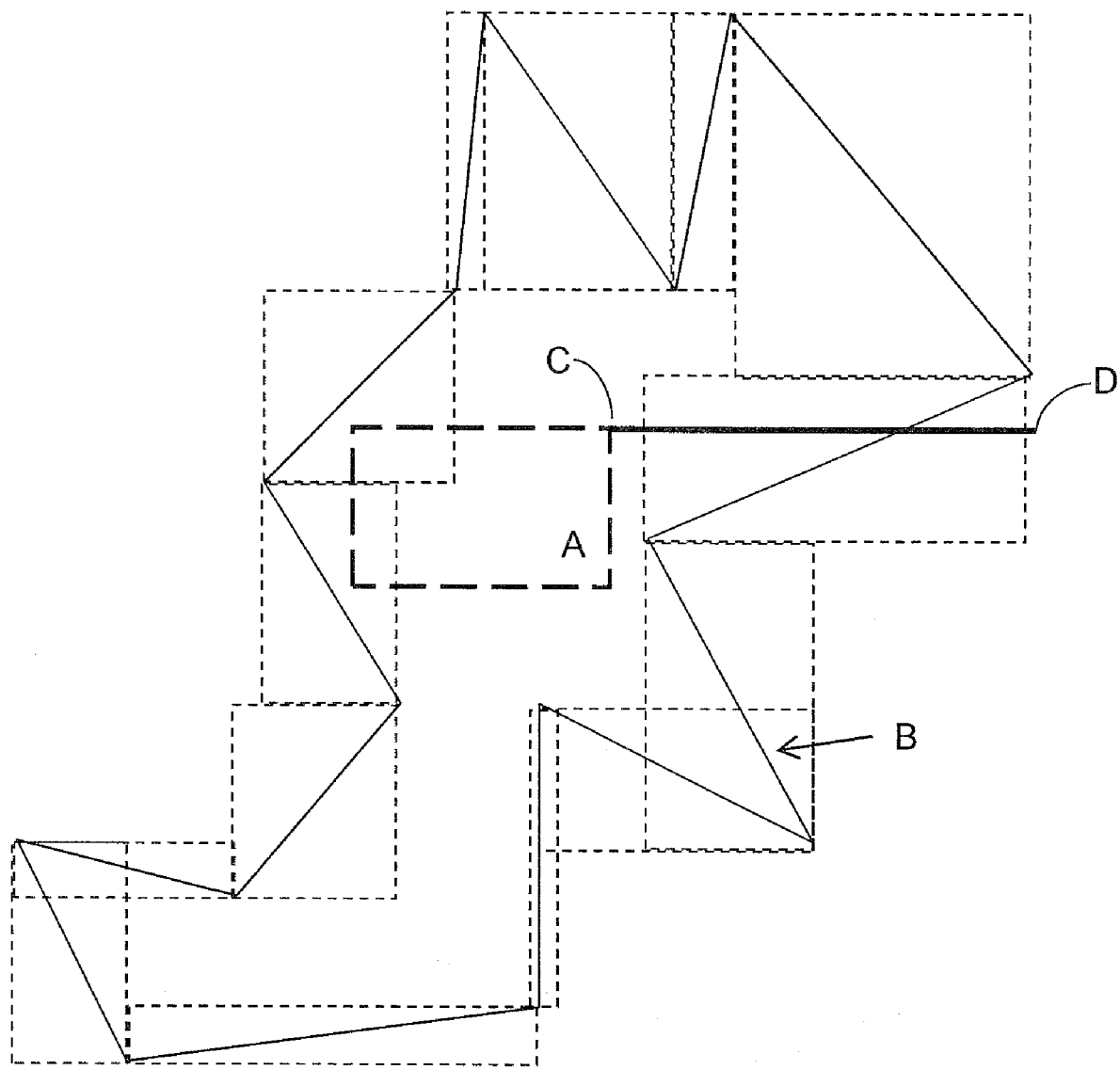
Figure 4D:
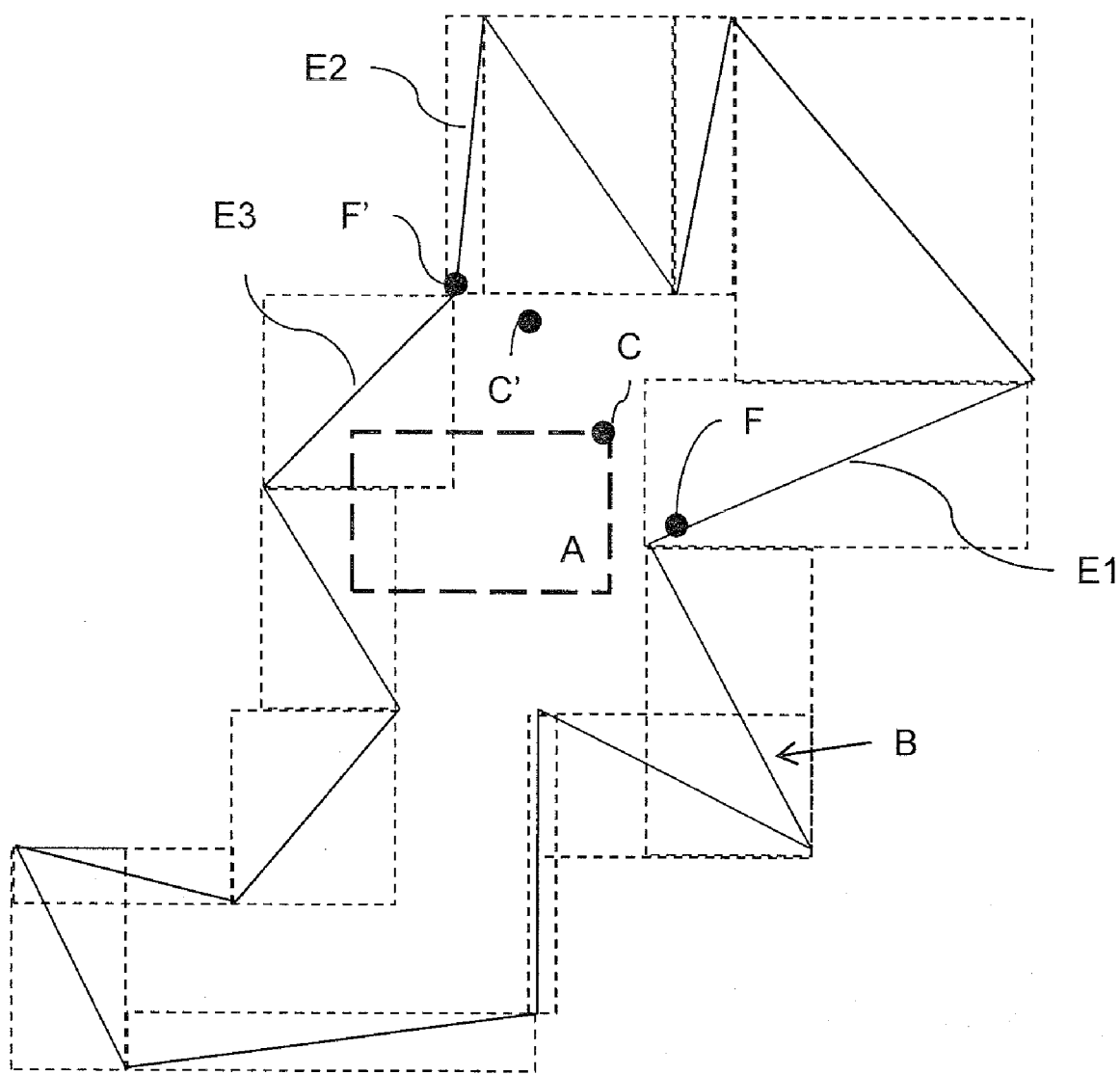
Figure 4E:
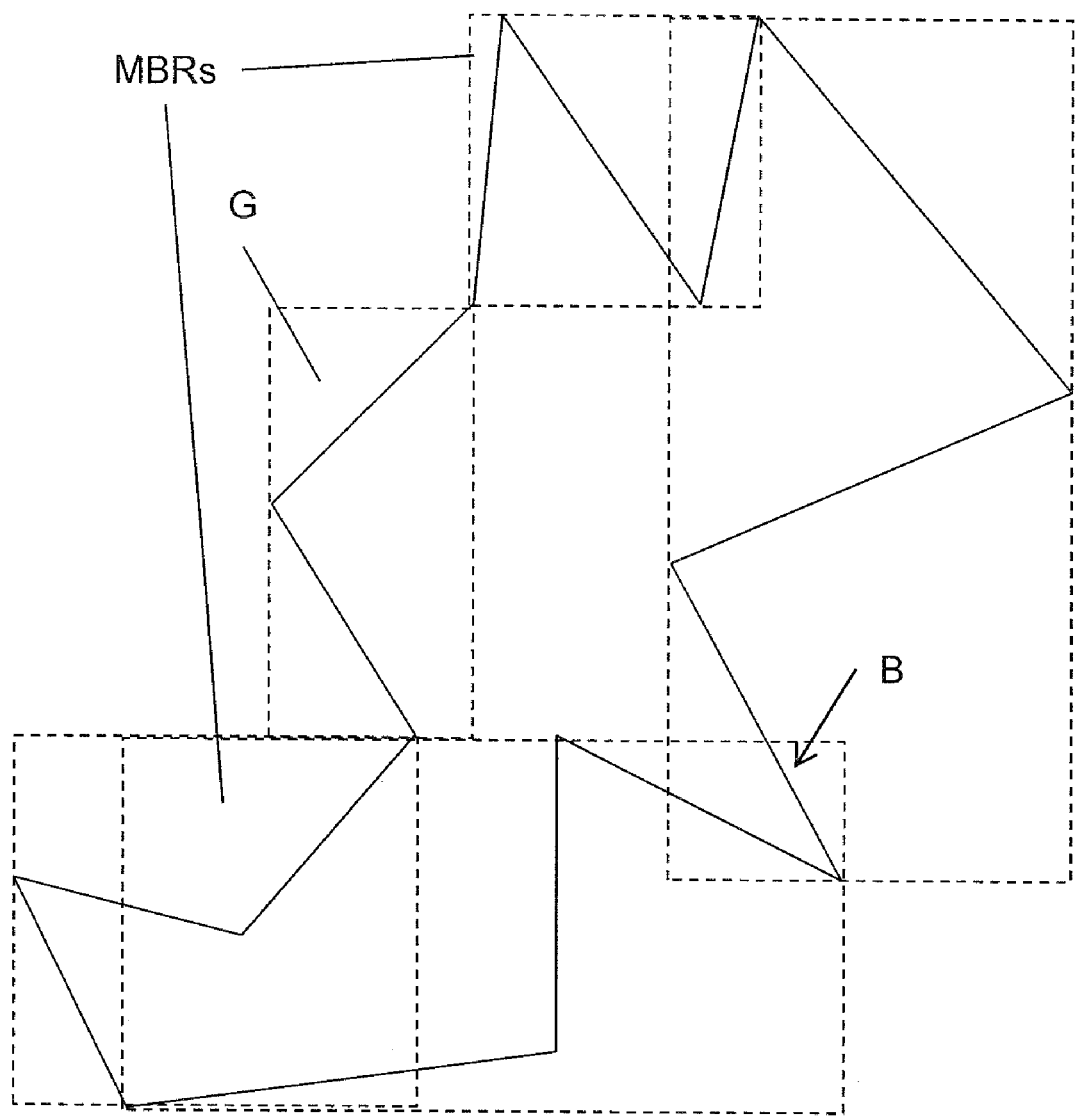

FIGS. 4A-4E illustrate an example of spatial query processing using an in-memory R-tree query window index structure. FIG. 4A illustrates a polygon window B with 14 edges E. The polygon window B corresponds to a query window that describes a spatial geometry having boundaries corresponding to the edges E. FIG. 4B illustrates how each boundary edge E of the query window B can used to build an MBR (shown in dashed lines). An in-memory R-tree query window index structure is built on these MBRs. The in-memory R-tree has a tree structure but here only leaf node MBRs are shown. Branch and root nodes can be built according to any appropriate R-tree algorithm. FIG. 4E illustrates a query window index structure that uses an MBR for every three edges (MBR G contains only two edges) to save memory.

Now that a query window index structure R-tree has been built, it can be compared to a spatial data index to determine a spatial relationship between the query window and the spatial index data. For the purposes of illustration, a spatial data index MBR shown as the rectangle A is to be compared to the query window index structure. Standard techniques may be employed to determine if there is an intersection between the spatial data index MBR A and the query window index structure. If an intersection is located, then at least one query window boundary E intersects the spatial data index MBR A, and the spatial data corresponding to the spatial data index MBR A can be fetched to do further processing (i.e., comparing the spatial data and the query window index structure element) in response to the query. If no intersection between the spatial data index MBR A and the boundary segments of the query window B is found, it means that the spatial data index MBR A is either completely contained within the query window B or lies outside the query window B. Note that while spatial data index MBR A intersects two query window index structure MBRs it does not intersect any edge E and lies completely within the polygon B.

To determine if the spatial data index MBR A is located within the query window B, a data point in spatial data index MBR A is selected and a determination is made as to whether the data point is inside the query window B. A single data point is sufficient in this case because the MBR contains only one region. Since it is already known that the spatial data index MBR A is either completely inside or outside the query window B, it follows that if a single point in A is inside B then the entire spatial data index MBR A must be in the query window B. A corner point C is selected because this data point is stored in the R-tree as part of the node entry corresponding to spatial data index MBR A.

FIG. 4C illustrates a ray-casting type method of determining if the data point C is contained within the query window B. A horizontal line segment D (or an MBR D) is described between the data point C and a query window index boundary point lying on an outer boundary of the query window index structure. A determination is made as to how many times the line segment intersects a polygon edge. According to the even-odd rule using in ray-casting for determining whether a point lies within or outside a polygon, if the number of intersections is odd, the point C is inside the query window B and the spatial data index MBR A lies within the query window B. If the number of intersections is even, the point C is outside the query window B and the spatial data index MBR A lies outside the query window B.

FIG. 4D illustrates an alternative method of determining if the data point C lies within the query window B using a nearest-neighbor search. An R-tree can be used to get the nearest neighbor of a point or geometry. Thus, given point C, the query window index structure can be used to determine which point on the boundary of the query window is closest to C. As can be seen in FIG. 4D, the closest point is determined to be point F on edge E1. The query window R-tree index structure defines the polygon B by identifying edges in a counterclockwise direction. Traversing the R-tree along edge E1 in the counterclockwise direction, a determination is made as to whether the point C is to the "left" or "right" of the edge E1. Based on the counterclockwise directional convention of the R-tree query window R-tree index structure, if the point C is to the left of the edge E1, then the point C can be determined to lie within the query window B. Note that in some instances, the nearest neighbor point may lie on an end point between two edges as is shown for an alternate corner point C'. The closest edge point to C' is point F', which lies on both edges E2 and E3. In this case, both edges are traversed to determine on which side the point C' lies.

Figure 5A:
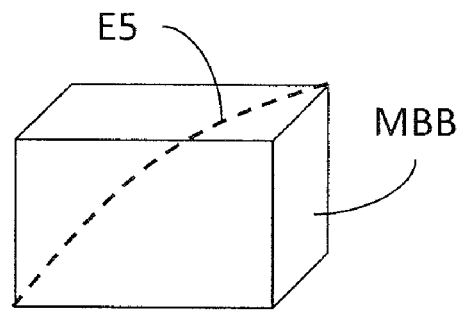
FIGS. 5A and 5B illustrate an example of spatial query processing using a query window index for geodetic data.
Figure 5B:
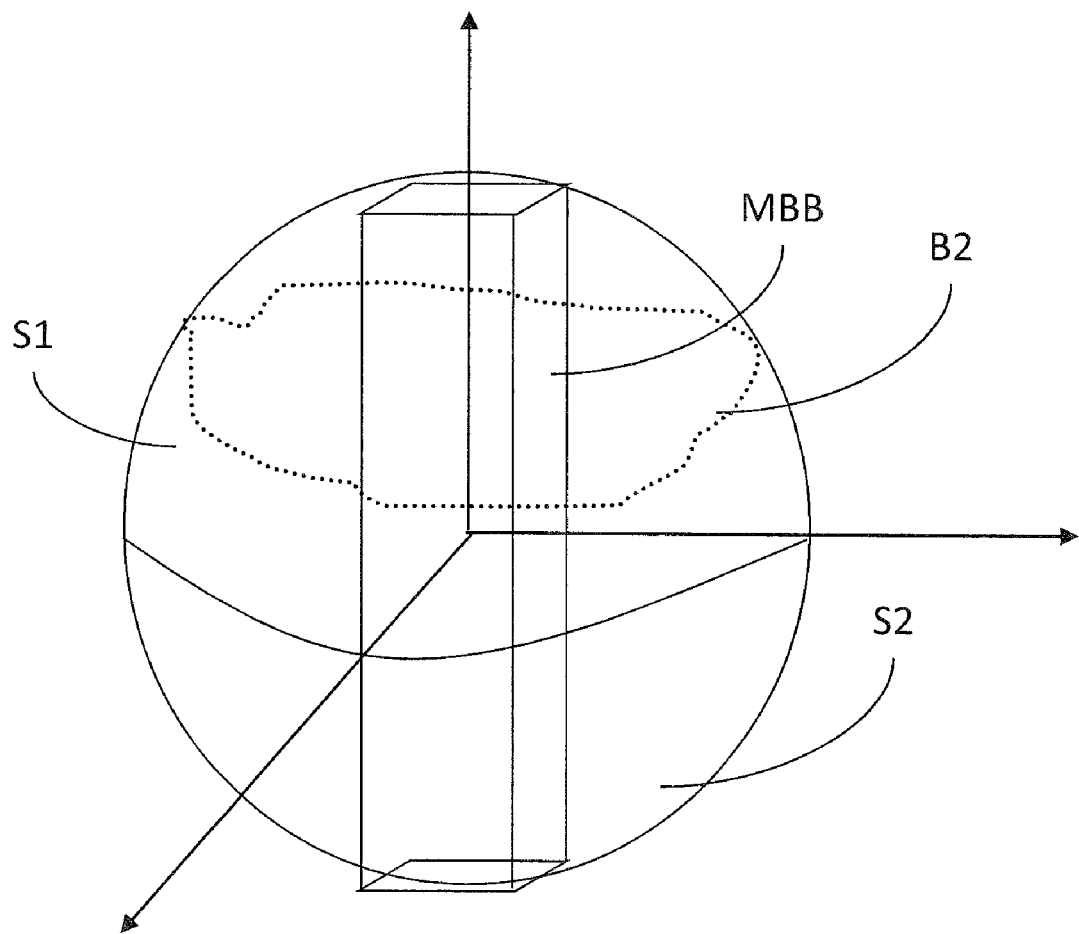

FIGS. 5A and 5B illustrate spatial query processing techniques that are adapted for use with three-dimensional geodetic spatial data. FIG. 5A illustrates how a geodetic edge E5 is used to build a three-dimensional minimum bounding box (MBB). Unlike two-dimensional MBRs, a three-dimensional MBB may include disconnected regions. The comparison between the spatial data index and the query window index structure described above can be adapted for geodetic data. Referring to FIG. 5B, a three dimensional MBB having ends (−0.1, −0.1, −1.0) and (0.1, 0.1, 1.0) is shown. The MBB is built from a unit sphere that contains two regions, a north pole region and a south pole region, which are not connected. To determine if the entirety of the MBB is inside a query window B2 (dashed line in the northern hemisphere S1), a data point from each region of the MBB should be checked against the query window index structure. For example, although the north pole region is inside the query window B2, the south pole region is not inside the query window B2. Therefore, the entirety of the MBB is not inside the query window.

While FIGS. 2-3 illustrates various actions occurring in serial, it is to be appreciated that various actions illustrated in FIGS. 2-3 could occur substantially in parallel. By way of illustration, a first process could receive a spatial query, a second process could construct a query window index structure, and a third process could compare the query window index structure with a spatial data index and/or spatial data. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes receiving a spatial query on spatial data that specifies a query window, where the spatial data has an associated spatial data index; constructing a query window index structure describing a geometry of the query window; and comparing the query window index structure to the spatial data index to determine a spatial relationship between the query window and the spatial data. While executable instructions associated with the above method are described as being stored on a computer-readable medium, it is to be appreciated that executable instructions associated with other example methods described herein may also be stored on a computer-readable medium.

Figure 6:
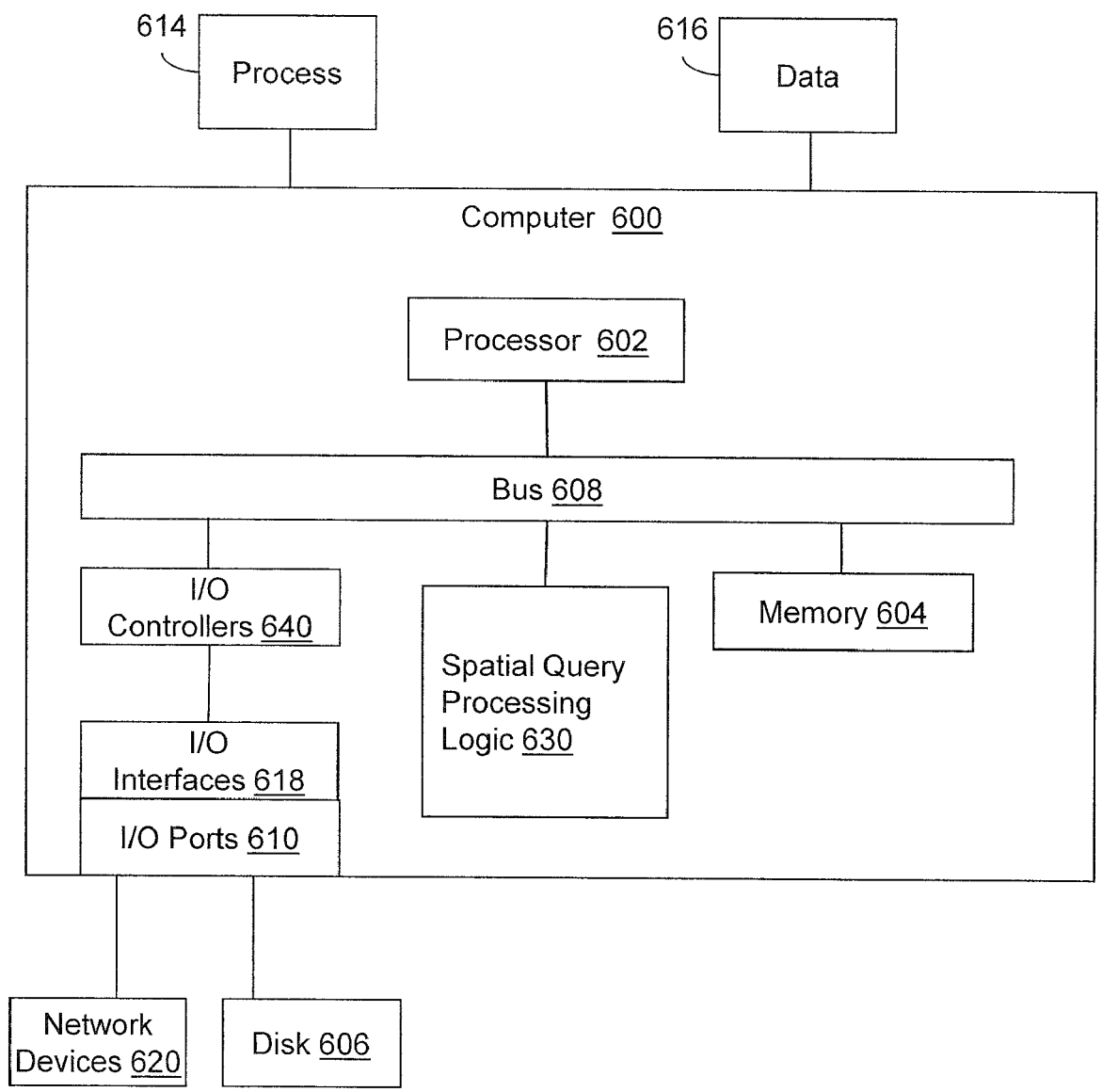
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a spatial query processing logic 630 configured to facilitate spatial query processing. In different examples, the spatial query processing logic 630 may be implemented in hardware, software, firmware, and/or combinations thereof. While the spatial query processing logic 630 is illustrated as a hardware component attached to the bus 608, it is to be appreciated that in one example, the spatial query processing logic 630 could be implemented in the processor 602.

Thus, spatial query processing logic 630 may provide means (e.g., hardware, software, firmware) for receiving a spatial query.

The means may be implemented, for example, as an ASIC programmed to perform spatial query processing using query window indexes. The means may also be implemented as computer executable instructions that are presented to computer 600 as data 616 that are temporarily stored in memory 604 and then executed by processor 602.

The spatial query processing logic 630 may also provide means (e.g., hardware, software, firmware) for constructing a query window index structure and means for comparing the query window index structure to a spatial data index, and if necessary, to spatial data.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method of spatial query processing, comprising:
   receiving, by at least one computer processor, a spatial query on spatial data that specifies a query window, where the spatial data has an associated spatial data index, and where the spatial data index includes a plurality of spatial data index elements;
   constructing, by the at least one computer processor, a query window index structure describing a geometry of the query window, where the query window index structure includes a plurality of query window index structure elements; and
   comparing, by the at least one computer processor, the query window index structure to the spatial data index to determine a spatial relationship between the query window and the spatial data by:
      identifying a spatial data index element;
      searching the query window index structure to determine if the spatial data index element intersects a query window index structure element;
      if the spatial data index element intersects the query window index structure element, accessing a spatial data store that stores the spatial data to determine if spatial data represented by the spatial data index element intersects the query window;
      if the spatial data index element does not intersect the query window index structure element, determining whether a selected data point lying in the spatial data index element is contained within the query window; and
      if the selected data point is contained within the query window, determining that the spatial data represented by the spatial data index element is contained within the query window.

2. The computer-implemented method of claim 1, wherein constructing the query window index structure is performed by constructing an R-tree index that includes sets of one or more boundary segments of the query window and an associated minimum bounding rectangle (MBR) that contains the one or more boundary segments.

3. The computer-implemented method of claim 1, comprising storing the query window index structure in memory associated with query processing.

4. The computer-implemented method of claim 1, wherein determining if the selected data point is contained within the query window is performed by:
   describing a line segment between the selected data point and a query window index boundary point lying on an outer boundary of the query window index structure element;
   determining if the line segment intersects a query window boundary; and
   if the line segment intersects the query window boundary an odd number of times, determining that the spatial data index element is contained within the query window.

5. The computer-implemented method of claim 1, wherein determining if the selected data point is contained within the query window is performed by:
   finding a nearest point to the selected data point on a query window boundary;
   identifying one or more query window boundary edges that include a nearest point;
   traversing the query window index structure associated with the identified boundary edges to determine if the selected data point is within the query window; and
   if the data point is within the query window, determining that the spatial data index element is contained within the query window.

6. The computer-implemented method of claim 1, wherein the spatial data comprises geodetic data and where the query window index structure is constructed by creating an R-tree having the plurality of query window index structure elements that comprise sets of one or more query window boundary segments and a minimum bounding box (MBB) that contains the one or more boundary segments, and wherein determining if the selected data point is contained within the query window is performed by:
   determining a number of regions that are contained by a spatial data index MBB;
   selecting a data point for each region;
   for each selected data point, finding a nearest point on a query window boundary;
   identifying one or more query window boundary edges that include each nearest data point;
   traversing a query window index structure associated with the identified boundary edges to determine if the selected data points are within the query window; and if the selected data points are within the query window, determining that the spatial data represented by the spatial data index element is contained within the query window.

7. A computing system for spatial query processing comprising:
   at least one computer processor;
   a spatial query processing logic, configured by the at least one computer processor, to receive a spatial query on spatial data that specifies a query window, where the spatial data has an associated spatial data index, and where the spatial data index includes a plurality of spatial data index elements;
   a query window index construction logic, configured by the at least one computer processor, to construct a query window index structure describing a geometry of the query window, where the query window index structure includes a plurality of query window index structure elements; and
   an index comparison logic, configured by the at least one computer processor, to compare the query window index structure to the spatial data index and to the spatial data by:
      identifying a spatial data index element;
      searching the query window index structure to determine if the spatial data index element intersects a query window index structure element;
      if the spatial data index element intersects the query window index structure element, accessing a spatial data store that stores the spatial data to determine if spatial data represented by the spatial data index element intersects the query window;
      if the spatial data index element does not intersect the query window index structure element, determining whether a selected data point lying in the spatial data index element is contained within the query window; and
      if the selected data point is contained within the query window, determining that the spatial data represented by the spatial data index element is contained within the query window; and
   where the spatial query processing logic is configured to return a spatial relationship between the query window and the spatial data as determined by the comparison between the query window index structure and the spatial data.

8. The computing system of 7, wherein the query window index construction logic is configured to construct an R-tree that includes sets of one or more boundary segments of the query window and minimum bounding rectangles (MBRs) that contain the sets.

9. The computing system of claim 7, wherein the index comparison logic is configured to determine if the selected data point is contained within the query window by:
   describing a line segment between the selected data point and a query window index boundary point lying on an outer boundary of the query window index structure element;
   determining if the line segment intersects a query window boundary; and
   if the line segment intersects the query window boundary an odd number of times, determining that the spatial data index element is contained within the query window.

10. The computing system of claim 7, wherein the index comparison logic is configured to determine if the selected data point is contained within the query window by:
   finding a nearest point to the selected data point on the query window boundary;
   identifying one or more query window boundary edges that include the nearest point;
   traversing the query window index structure associated with the identified boundary edges to determine if the selected data point is within the query window; and
   if the data point is within the query window, determining that the spatial data index element is contained within the query window.

11. The computing system of claim 7, wherein:
   the spatial query processing logic comprises means for receiving the spatial query on the spatial data that specifies the query window;
   the query window index construction logic comprises means for constructing and is further configured to construct the query window index structure describing the geometry of the query window; and
   the index comparison logic comprises means for comparing the query window index structure to the spatial data index and the spatial data to determine the spatial relationship between the query window and the spatial data.

12. A non-transitory computer-readable medium storing computer-executable instructions executed by a computer causing the computer to perform a method of spatial query processing, the method comprising:
   receiving a spatial query on spatial data that specifies a query window, where the spatial data has an associated spatial data index, and where the spatial data index includes a plurality of spatial data index elements;
   constructing a query window index structure describing a geometry of the query window, where the query window index structure includes a plurality of query window index structure elements; and
   comparing the query window index structure to the spatial data index and to the spatial data to determine a spatial relationship between the query window and the spatial data by:
      identifying a spatial data index element;
      searching the query window index structure to determine if the spatial data index element intersects a query window index structure element;
      if the spatial data index element intersects the query window index structure element, accessing a spatial data store that stores the spatial data to determine if spatial data represented by the spatial data index element intersects the query window;
      if the spatial data index element does not intersect the query window index structure element, determining whether a selected data point lying in the spatial data index element is contained within the query window; and
      if the selected data point is contained within the query window, determining that the spatial data represented by the spatial data index element is contained within the query window.

13. The non-transitory computer-readable medium of claim 12, wherein the instructions include creating an R-tree that includes sets of one or more boundary segments of the query window and minimum bounding rectangles (MBRs) that contain the sets.

14. The non-transitory computer-readable medium of claim 12, wherein the instructions for determining if the selected data point is contained within the query window comprise:

describing a line segment between the selected data point and a query window index boundary point lying on an outer boundary of the query window index structure element;

determining if the line segment intersects a query window boundary; and if the line segment intersects the query window boundary an odd number of times, determining that the spatial data index element is contained within the query window.

15. The non-transitory computer-readable medium of claim 12, wherein the instructions for determining if the selected data point is contained within the query window comprise:

finding a nearest point to the selected data point on the query window boundary;

identifying one or more query window boundary edges that include the nearest point;

traversing the query window index structure associated with the identified boundary edges to determine if the selected data point is within the query window; and if the data point is within the query window, determining that the spatial data index element is contained within the query window.

16. The non-transitory computer-readable medium of claim 12, wherein the instructions for determining if the selected data point is contained within the query window include:

determining a number of regions that are contained by a spatial data index minimum bounding box;

selecting a data point in each region;

for each selected data point, finding a nearest point on the query window boundary;

identifying one or more query window boundary edges that include each nearest data point;

traversing the query window index structure associated with the identified boundary edges to determine if the selected data points are within the query window; and if the selected data points are within the query window, determining that the spatial data represented by the spatial data index element is contained within the query window.

* * * * *

UNITED STATES PATENT AND TRADEMARK OFFICE
CERTIFICATE OF CORRECTION

PATENT NO.         : 8,386,468 B2
APPLICATION NO.    : 12/869085
DATED              : February 26, 2013
INVENTOR(S)        : Hu et al.

It is certified that error appears in the above-identified patent and that said Letters Patent is hereby corrected as shown below:

On title page, in column 2, under "Other Publications", line 1, delete "Databse" and insert
-- Database --, therefor.

Signed and Sealed this
Fourth Day of June, 2013

Teresa Stanek Rea
*Acting Director of the United States Patent and Trademark Office*